(12) United States Patent  
Gaw et al.

(10) Patent No.: US 9,962,818 B2
(45) Date of Patent: May 8, 2018

(54) APPARATUS AND METHOD FOR THE INSTALLATION OF A THERMOFORMABLE FASTENER ASSEMBLY AT A PREDETERMINED PRELOAD TORQUE VALUE

(71) Applicant: The Boeing Company, Chicago, IL (US)

(72) Inventors: Kevin O. Gaw, Tukwila, WA (US); Sean D. Morden, Federal Way, WA (US)

(73) Assignee: The Boeing Company, Chicago, IL (US)

(*) Notice: Subject to any disclaimer, the term of this patent is extended or adjusted under 35 U.S.C. 154(b) by 568 days.

(21) Appl. No.: 14/517,138

(22) Filed: Oct. 17, 2014

(65) Prior Publication Data

US 2016/0107298 A1 Apr. 21, 2016

(51) Int. Cl.

| | | |
|---|---|---|
| *F16B 39/02* | (2006.01) | |
| *B25B 23/00* | (2006.01) | |
| *B25B 13/48* | (2006.01) | |
| *B25B 13/06* | (2006.01) | |
| *F16B 33/00* | (2006.01) | |
| *B25B 23/14* | (2006.01) | |

(52) U.S. Cl.
CPC .............. *B25B 23/00* (2013.01); *B25B 13/06* (2013.01); *B25B 13/48* (2013.01); *F16B 33/006* (2013.01); *F16B 39/02* (2013.01); *F16B 39/026* (2013.01); *B25B 23/14* (2013.01)

(58) Field of Classification Search
CPC ......... B25B 23/00; B25B 13/48; B25B 13/06; B25B 23/14; B25B 29/02; F16B 39/026; F16B 33/006; F16B 39/02; F16B 39/01; F16B 21/10; F16B 37/06; F25B 13/00; F25B 17/00; F25B 19/00; F25B 21/00; A61B 17/8875; B23P 19/00; Y10T 403/49; Y10T 403/4974; Y10T 403/4958
USPC .......................................................... 428/99
See application file for complete search history.

(56) References Cited

U.S. PATENT DOCUMENTS

| | | | | |
|---|---|---|---|---|
| 3,003,378 A * | 10/1961 | Hotchner | ................ | B25B 23/00 29/509 |
| 3,603,132 A * | 9/1971 | Holmes | ................ | B25B 21/001 29/437 |
| 3,938,239 A * | 2/1976 | Lauth | .................... | B23P 19/062 29/243.519 |
| 4,355,917 A * | 10/1982 | Bunger | ................... | F02N 15/06 403/24 |
| 6,784,597 B1 * | 8/2004 | Hess | ....................... | F01D 5/066 310/320 |
| 2002/0066620 A1 * | 6/2002 | Lindsey | .................... | E06C 1/34 182/92 |
| 2008/0301926 A1 * | 12/2008 | Bucknell | ............... | B23P 19/067 29/452 |
| 2015/0093210 A1 * | 4/2015 | Doye | .................... | F16B 35/065 411/166 |

* cited by examiner

*Primary Examiner* — Ryan J Walters
*Assistant Examiner* — Lawrence Averick
(74) *Attorney, Agent, or Firm* — Joseph M. Rolnicki; Evans & Dixon, L.L.C.

(57) ABSTRACT

An apparatus and its method of use enables a thermoplastically deformable fastener assembly to be deformed to hold an installation preload torque after the fastener has been torqued to a predetermined value.

14 Claims, 6 Drawing Sheets

APPARATUS AND METHOD FOR THE INSTALLATION OF A THERMOFORMABLE FASTENER ASSEMBLY AT A PREDETERMINED PRELOAD TORQUE VALUE

FIELD

This disclosure pertains to an apparatus and method that enables a thermoplastically deformable fastener assembly to be deformed to hold an installation preload and maintain or increase the breakaway torque after the fastener has been torqued to a predetermined value.

BACKGROUND

In the construction of aircraft and other vehicles having combustion engines and fuel tanks, it is desirable to reduce the presence of electrical conductors in the environment of the fuel tank to reduce the potential of an electrical spark in the area of the fuel tank. Non-conductive plastic nut and bolt fastener assemblies have been used in these environments in place of conductive metal nut and bolt fastener assemblies. Additionally, replacing thousands of metal fastener assemblies used in constructing an aircraft or other vehicle with plastic fastener assemblies reduces the weight of the aircraft or vehicle, making the aircraft or vehicle more fuel efficient. However, existing plastic fastener assemblies are known to lose preload torque. A plastic fastener assembly comprising a threaded bolt and nut can lose preload torque or have the fastener assembly preload torque decrease due to the unthreading of the nut from the bolt over time.

SUMMARY

The apparatus of this disclosure that torques a threaded nut and bolt fastener assembly to a preload, and then deforms the fastener assembly to hold the preload resolves the issue of existing plastic fastener assemblies that are known to lose preload torque. The apparatus is ideally used with thermoplastic nut and bolt fastener assemblies. The apparatus is basically comprised of a wrench device that rotates the nut on the bolt and torques the nut to a predetermined torque, and a piercing tip that pierces into the fastener assembly to hold the fastener assembly at the preload torque.

The wrench device has a socket with a plurality of engagement surfaces inside the socket. The socket engagement surfaces are dimensioned to engage around the nut of the nut and bolt fastener assembly. The wrench device is operable to rotate the socket around the bolt, whereby the socket engaging around the nut rotates the nut on the bolt and torques the nut to a predetermined torque and preload.

The piercing tip of the apparatus is positioned adjacent the wrench device socket. The piercing tip is moveable between first and second positions of the piercing tip relative to the socket. In the first position the piercing tip is displaced from the socket. In the second position the piercing tip extends into the socket and into the fastener assembly inside the socket, deforming the fastener assembly.

A heat source of the apparatus communicates with the piercing tip. The heat source heats the piercing tip when the piercing tip is moved to its second position. The heated piercing tip extending into the fastener assembly thermally deforms the fastener assembly. The deformation of the fastener assembly holds the fastener assembly at the preload torque.

The features, functions, and advantages that have been discussed can be achieved independently in various embodiments or may be combined in yet other embodiments, further details of which can be seen with reference to the following description and drawings.

DESCRIPTION

The apparatus of this disclosure torques a threaded nut and bolt fastener assembly to a preload torque and then deforms the fastener assembly to hold the preload torque. In the description to follow the fastener assembly is a plastic nut and bolt fastener assembly. The plastic is a thermoplastic, although other types of plastic nut and bolt fastener assemblies could be used with the apparatus. Furthermore, the apparatus could be adapted to be used to torque and then deform fastener assemblies other than plastic nut and bolt fastener assemblies, for example metal nut and bolt fastener assemblies.

Figure 1:
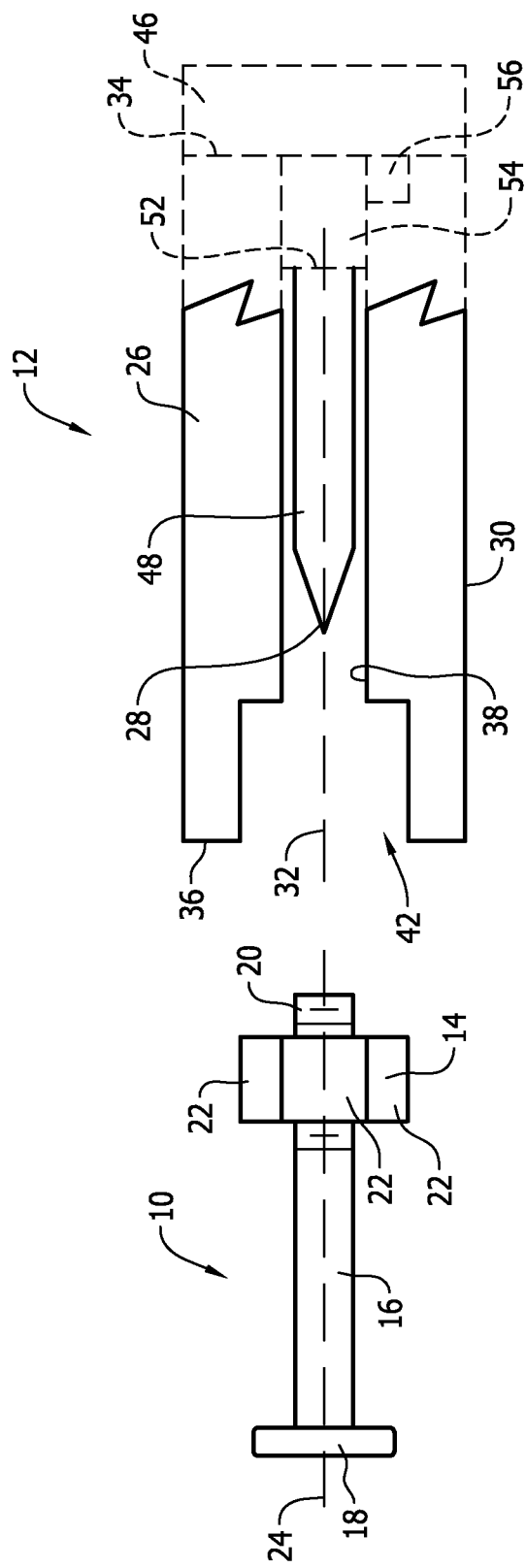
FIG. 1 is a representation of a side view of a thermoplastic nut and bolt fastener assembly and a first embodiment of the apparatus of this disclosure.

FIG. 1 is a representation of a side view of a threaded nut and bolt fastener assembly 10 and a first embodiment of the apparatus 12 of this disclosure.

The fastener assembly 10 is a nut 14 and bolt 16 thermoplastic fastener assembly. As stated earlier, other materials could be used in producing the fastener assembly 10. The bolt 16 has a bolt head 18 at one end of the bolt and screw threading 20 adjacent an opposite end of the bolt. The nut 14 is a hex nut or a nut having six side surfaces 22. The nut 14 could have other, equivalent configurations. The nut 14 has internal screw threading (not shown) that is screw threaded on the bolt screw threading 20. The nut 14 and bolt 16 fastener assembly 10 has a center axis 24 that defines mutually perpendicular axial and radial directions relative to the fastener assembly 10. In use of the fastener assembly 10 in joining two or more structural pieces together, the nut 14 is to be rotated on the bolt 16 to a predetermined preload torque in securing the structural features together.

The apparatus 12 is basically comprised of a wrench device 26 and a piercing tip 28. The wrench device 26 and piercing tip 28 are each constructed of a metal or other equivalent material that gives the wrench device 26 and the piercing tip 28 sufficient strength for their intended functions.

Figure 2:
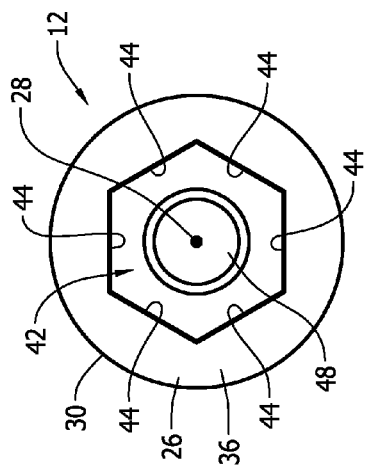
FIG. 2 is a representation of a left end view of the apparatus shown in FIG. 1.

The wrench device 26 is represented schematically in the drawing figures. The device 26 has a cylindrical exterior surface 30 with a center axis 32. The wrench device center axis 32 defines mutually perpendicular axial and radial directions relative to the wrench device 26. The device has an axial length that extends between a proximal end 34 and a distal end 36 of the device. A cylindrical interior surface 38 surrounds a center bore of the device that is coaxial with the center axis 32. The cylindrical surface 38 extends axially through the device from the device proximal end 34 to a socket 42 recessed axially in the device distal end 36. Referring to FIG. 2, the socket 42 is a hexagonal socket having six engagement surfaces 44. The engagement surfaces 44 are dimensioned to be positioned around the nut 14 of the fastener assembly with at least two of the engagement surfaces 44 engaging with opposite side surfaces 22 of the nut. The wrench device 26 can be a hand held tool that is manually rotated about the device center axis 32. Alternatively, the wrench device 26 could be an automated tool that is controlled to automatically rotate about the device center axis 32. The device being a manual tool or an automated tool is represented schematically by the dashed lines 46 in FIG. 1.

The piercing tip 28 is positioned at a distal end of an elongate cylindrical rod 48. The rod 48 is positioned in the interior bore surrounded by the wrench device interior surface 38 and has a center axis that is coaxial with the wrench device center axis 32. The rod proximal end 52 is operatively connected with an actuator and heat source 54. The actuator and heat source 54 is operable to move the rod and the piercing tip 28 axially between a first position represented in FIG. 1 to a second position where the piercing tip 28 of the rod 48 is moved into the socket 42. The actuator and heat source 54 also heats the piercing tip 28 when the piercing tip is in the second position. The actuator and heat source 54 communicates with a torque sensing device 56 in the wrench device tool 46 and is controlled to move the piercing tip 28 from the first position to the second position in response to the torque sensing device 56 sensing the nut 14 being turned on the bolt 16 to the predetermined preload torque.

Figure 3:
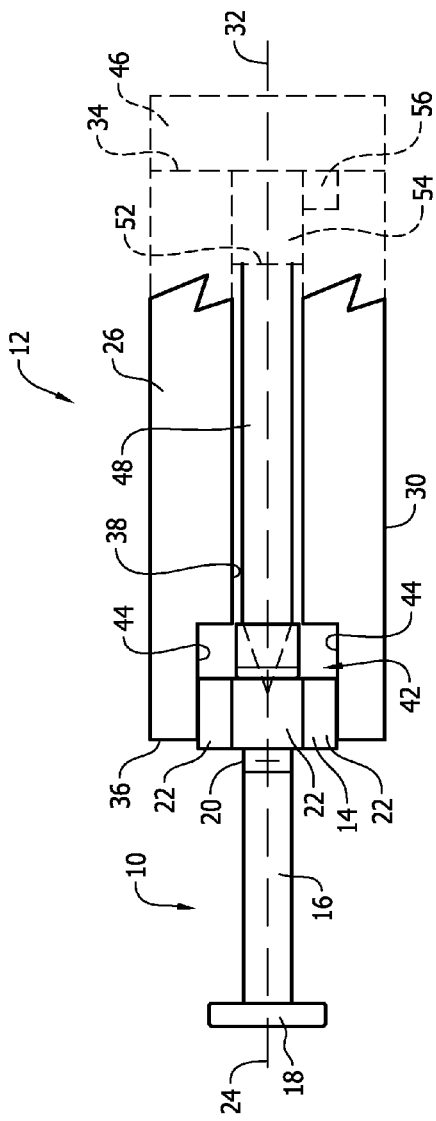
FIG. 3 is a representation of the thermoplastic fastener assembly engaged by the apparatus of FIG. 1.

FIG. 3 is a representation of the method of using the apparatus 12 to torque the nut 14 on the bolt 16 of the fastener assembly 10 to a preload torque and then deforming the fastener assembly 10 to hold the preload torque. As represented in FIG. 3, the wrench device 26 and the wrench device socket 42 are moved axially toward the nut 14 and bolt 16 fastener assembly 10 until the nut 14 is received in the socket 42. The socket engagement surfaces 44 are positioned around the nut 14 with at least two of the engagement surfaces 44 engaging with opposite side surfaces 22 of the nut 14. The wrench device socket 42 is then rotated to tighten the nut 14 on the bolt 16. The wrench device socket 42 is rotated and torques the nut 14 to a preload torque on the bolt 16. When the preload torque is reached, the torque sensing device 56 senses the torque and communicates with the actuator and heat source 54 to initiate the axial movement of the piercing tip 28. The actuator and heat source 54 moves the piercing tip 28 from its first position represented in FIG. 1, to its second position represented in FIG. 3. In the second position of the piercing tip 28 the tip pierces into the fastener assembly 10, and more specifically pierces into the end of the bolt 16 with the screw threading 20. The heat source of the actuator 54 then heats the piercing tip 28. The heated piercing tip 28 thermally deforms the fastener assembly 10 and more specifically the fastener assembly bolt 16. The deformation of the fastener assembly 10 holds the fastener assembly at the preload torque. Thus, the deformed fastener assembly 10 overcomes the problem of the torqued bolt 16 and nut 14 of the fastener assembly losing their preload torque.

Figure 4:
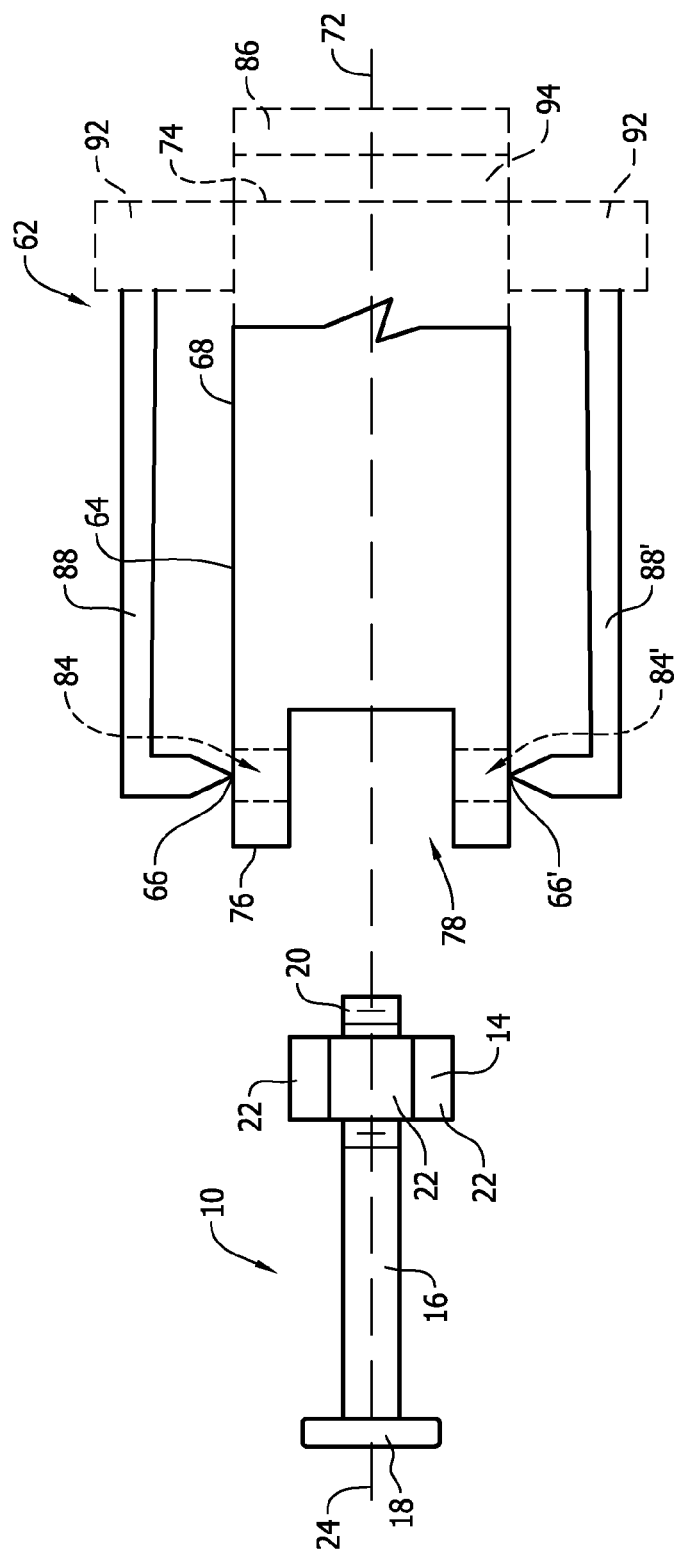
FIG. 4 is a representation of a side view of the thermoplastic nut and bolt fastener assembly and a further embodiment of the apparatus of this disclosure.
Figure 5:
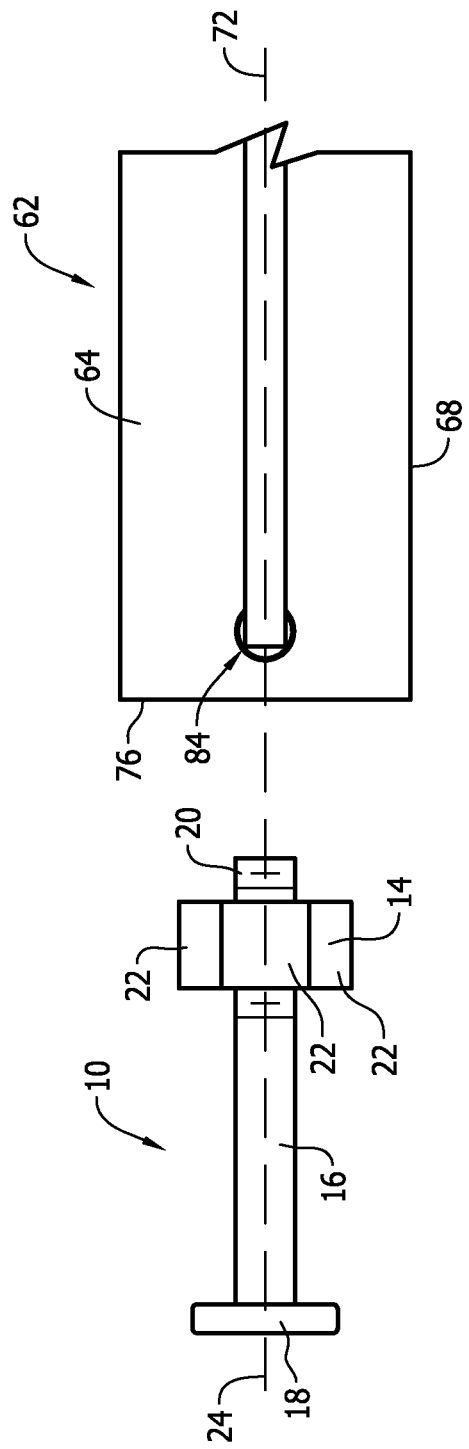
FIG. 5 is a representation of a top plan view of the fastener assembly and apparatus of FIG. 4.

FIG. 4 is a representation of a side view of the fastener assembly 10 with a second embodiment of the apparatus 62. As in the first embodiment 12, the second embodiment of the apparatus 62 is also comprised of a wrench device 64 and a piercing tip 66. The second embodiment of the apparatus 62 also torques the nut 14 on the bolt 16 of the fastener assembly 10 to a preload torque and then deforms the fastener assembly 10 to hold the preload torque. However, there are structural differences in the second embodiment of the apparatus 62.

Figure 6:
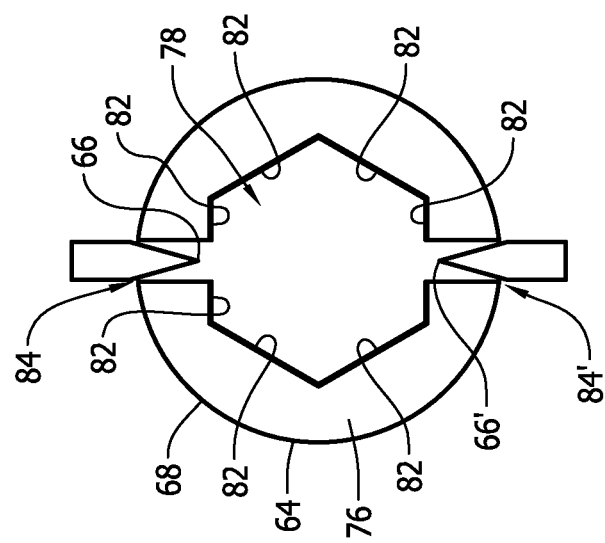
FIG. 6 is a representation of a left end view of the apparatus shown in FIG. 4.

The wrench device 64 is schematically represented in the drawing figures. As shown in FIG. 4, the wrench device 64 has a cylindrical exterior surface 68 with a center axis 72 that defines mutually perpendicular axial and radial directions relative to the wrench device 64. The wrench device 64 has an axial length that extends from a proximal end 74 of the device to a distal end 76 of the device. As in the first described embodiment, the wrench device 64 has a socket 78 recessed axially in the device distal end 76. Referring to FIG. 6, the socket 78 has six engagement surfaces 82 that are dimensioned to be positioned around the nut 14 of the fastener assembly 10 with at least two of the engagement surfaces 82 engaging against opposite sides 22 of the nut. The socket 78 also has a pair of openings 84, 84' that extend radially through opposite sides of the socket 78. As represented in FIG. 6, the pair of openings 84, 84' extend through the socket 78 and between at least two engagement surfaces 82 of the socket. As in the first described embodiment, the wrench device 64 and the socket 78 can be part of a hand held tool 86 that is manually rotated about the device center axis 72. Alternatively, the wrench device 64 and the socket 78 could be an automated tool that is controlled to automatically rotate about the center axis 72. The device 64 being a manual tool or an automated tool is represented schematically by the dashed lines 86 in FIG. 4.

Figure 7:
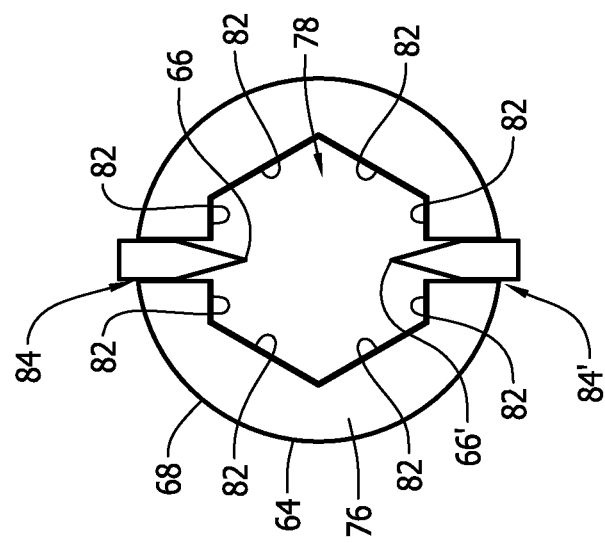
FIG. 7 is a representation of the left end view of the apparatus similar to that of FIG. 6, but representing the apparatus when engaging the fastener assembly.

As represented in FIG. 4, the second embodiment of the apparatus 62 comprises a pair of piercing tips 66, 66'. Each of the piercing tips 66, 66' is positioned at a distal end of an elongate rod 88, 88'. The opposite proximal ends of the rods 88, 88' are operatively connected with an actuator and heat source represented by the dashed lines 92 in FIG. 4. The actuator and heat source 92 is operable to control movement of the piercing tips 66, 66' radially between first positions of the tips represented in FIG. 4, to second positions of the tips represented in FIGS. 7 and 8. In this embodiment of the apparatus 62 the piercing tips 66, 66' are moved from the first positions radially inwardly through the socket openings 84, 84' into the socket 78 as represented in FIG. 7.

As with the first embodiment of the apparatus 12, a torque sensing device 94 communicates with the actuator and heat source 92. The torque sensing device 94 senses the torque exerted by the wrench device socket 78 on the nut 14 as the wrench device 64 and socket 78 torque the nut 14 on the bolt 16 of the fastener assembly 10.

Figure 8:
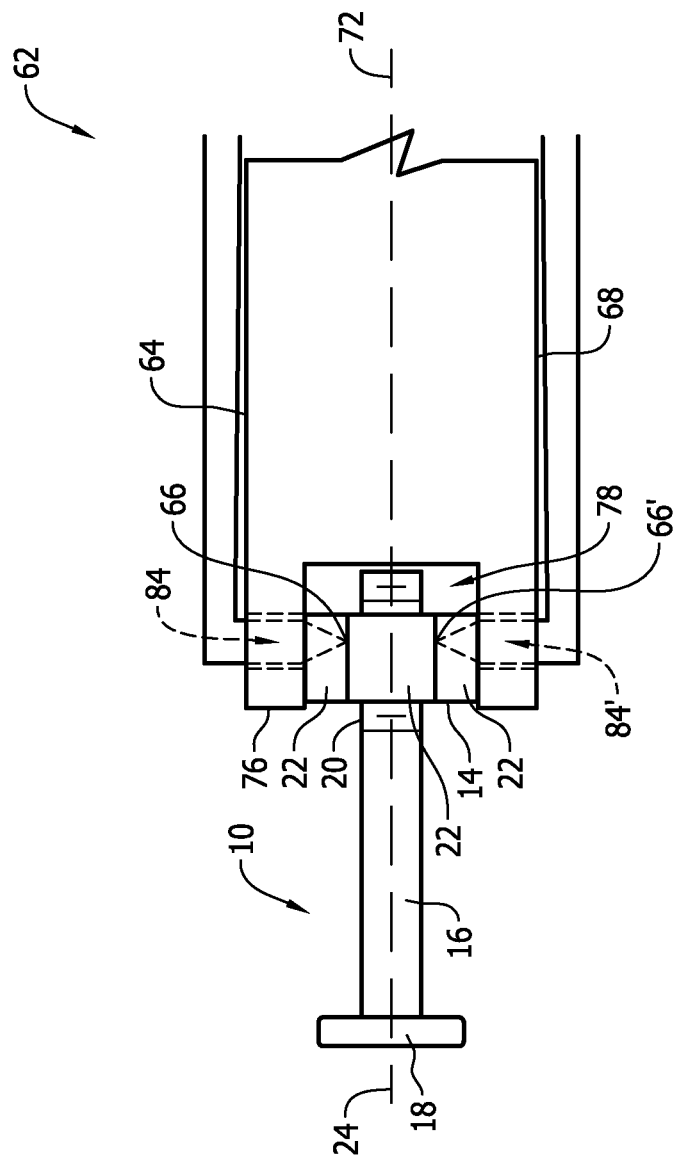
FIG. 8 is a representation of a side view of the apparatus of FIG. 4 shown engaging the fastener assembly.

The second embodiment of the apparatus 62 operates in a similar manner to that of the first embodiment of the apparatus 12. FIG. 8 is a representation of the method of using the apparatus 62 to torque the nut 14 on the bolt 16 of the fastener assembly 10 to a preload torque and then deforming the fastener assembly 10 to hold the preload torque. As represented in FIG. 8, the wrench device 64 and the wrench device socket 78 are moved axially toward the nut 14 and bolt 16 fastener assembly 10 until the nut 14 is received in the socket 78. The socket engagement surfaces 82 are positioned around the nut 14 with at least two of the engagement surfaces 82 engaging with opposite side surfaces 22 of the nut 14. The wrench device socket 78 is then rotated to tighten the nut 14 on the bolt 16. The wrench device socket 78 is rotated and torques the nut 14 to a preload torque on the bolt 16. When the preload torque is reached, the torque sensing device 94 senses the torque and communicates with the actuator and heat source 92 to initiate the radial movement of the piercing tips 66, 66'. The actuator and heat source 92 moves the piercing tips 66, 66' from their first positions represented in FIGS. 4 and 6, to their second positions represented in FIGS. 7 and 8. In the second positions of the piercing tips 66, 66' the tips pierce into the fastener assembly 10, and more specifically pierce into the opposite sides of the nut 14. The heat source of the actuator and heat source 92 then heats the piercing tips 66, 66'. The heated piercing tips 66, 66' thermally deform the fastener assembly 10 and more specifically the fastener assembly nut 14. The deformation of the fastener assembly 10 holds the fastener assembly at the preload torque. Thus, the deformed fastener assembly 10 overcomes the problem of the torqued bolt 16 and nut 14 of the fastener assembly losing their preload torque.

As various modifications could be made in the construction of the apparatus and its method of operation herein described and illustrated without departing from the scope of the invention, it is intended that all matter contained in the foregoing description or shown in the accompanying drawings shall be interpreted as illustrative rather than limiting. Thus, the breadth and scope of the present disclosure should not be limited by any of the above described exemplary embodiments, but should be defined only in accordance with the following claims appended hereto and their equivalents.

The invention claimed is:

1. An apparatus for torquing a nut and bolt fastener assembly to a preload and then deforming the fastener assembly to hold the preload,
the apparatus comprising:
a wrench device having a socket with a plurality of engagement surfaces inside the socket,
the socket engagement surfaces being dimensioned to engage around the nut of the nut and bolt fastener assembly,
the wrench device being operable to rotate the socket around the bolt whereby the socket engaging around the nut rotates the nut on the bolt and torques the nut to a preload; and,
a piercing tip adjacent the socket,
the piercing tip being moveable between first and second positions of the piercing tip relative to the socket where in the first position the piercing tip is displaced from the socket and in the second position the piercing tip extends into the socket and into the fastener assembly inside the socket and deforms the fastener assembly; and
the nut and bolt fastener assembly being thermoplastic; and
a heat source communicating with the piercing tip,
the heat source heating the piercing tip whereby in a second position the piercing tip extends into the fastener assembly and thermally deforms the fastener assembly.

2. The apparatus of claim 1,
further comprising:
the bolt of the fastener assembly having a center axis that defines mutually perpendicular axial and radial directions relative to the fastener assembly;
the wrench device being moveable axially relative to the fastener assembly to engage the socket engagement surfaces around the nut of the fastener assembly; and,
the piercing tip being moveable axially relative to the fastener assembly, the piercing tip moving axially into the socket and into the fastener assembly when the piercing tip is moved from the first position to the second position of the piercing tip relative to the socket.

3. The apparatus of claim 1,
further comprising:
the bolt of the fastener assembly having a center axis that defines mutually perpendicular axial and radial directions relative to the fastener assembly;
the wrench device being moveable axially relative to the fastener assembly to engage the socket engagement surfaces around the nut of the fastener assembly;
the socket having an opening extending radially through the socket and between the at least two engagement surfaces of the plurality of engagement surfaces inside the socket; and,
the piercing tip being moveable radially through the opening through the socket, into the socket and into the fastener assembly when the piercing tip is moved from the first position to the second position of the piercing tip.

4. An apparatus for manipulating a fastener comprising a bolt and a nut on an end of the both,
the apparatus comprising:
a wrench device,
the wrench device having a center axis that defines mutually perpendicular axial and radial directions relative to the wrench device,
the wrench device being rotatable around the center axis,
the wrench device having an axial length that extends between a proximal end of the wrench device and a distal end of the wrench device,
the wrench device having a center bore that is coaxial with the center axis of the wrench device,
the center bore extending axially through the wrench device from the proximal end of the wrench device to a socket received axially in the distal end of the wrench device,
the socket having engagement surfaces,
the engagement surfaces being positioned on opposite sides of the center axis of the wrench device,
the engagement surfaces of the socket being configured to be positioned on radially opposite sides of the nut on the end of the bolt in response to the socket being positioned around the nut on the end of the bolt;
a rod positioned in the center bore of the wrench device,
the rod having an axial length that extends between a proximal end of the rod and a distal end of the rod,
the rod having a piercing tip at the distal end of the rod;
an actuator operatively connected to the proximal end of the rod,
the actuator being operable to move the rod and the piercing tip axially between a first position of the rod and the piercing tip relative to the wrench device and a second position of the rod and the piercing tip relative to the wrench device where the piercing tip is in the socket; and,
the piercing tip being configured to pierce and deform the end of the bolt in response to the rod and the piercing tip being moved to the second position of the rod and the piercing tip relative to the wrench; and the nut and bolt fastener assembly being thermoplastic; and a heat source communicating with the piercing tip, the heat source heating the piercing tip whereby in a second position the piercing tip extends into the fastener assembly and thermally deforms the fastener assembly.

5. The apparatus of claim 4, further comprising:

a torque sensing device, the torque sensing device operatively communicating with actuator, the actuator being operable to move the rod and the piercing tip from the first position of the rod and the piercing tip relative to the wrench device to the second position of the rod and the piercing tip relative to the wrench device in response to the torque sensing device sensing the nut being turned on the bolt by the wrench device to a predetermined preload torque of the nut on the bolt.

6. The apparatus of claim 4, further comprising:

the socket is a hexagonal socket with six engagement surfaces.

7. The apparatus of claim 4, further comprising:

the apparatus is a handheld tool that manually rotates the wrench device around the center axis of the wrench device.

8. The apparatus of claim 4, further comprising:

the apparatus is an automated tool that is operable to automatically rotate the wrench device around the center axis of the wrench device.

9. An apparatus for manipulating a fastener comprising a bolt and a nut on an end of the bolt, the apparatus comprising:

a wrench device, the wrench device having a center axis that defines mutually perpendicular axial and radial directions relative to the wrench device, the wrench device being rotatable around the center axis, the wrench device having an axial length that extends between a proximal end of the wrench device and a distal end of the wrench device, the wrench device having an interior surface that surrounds a center bore of the wrench device, the center bore being coaxial with the center axis of the wrench device, the center bore extending axially through the wrench device from the proximal end of the wrench device to a socket recessed axially in the distal end of the wrench device, the socket having engagement surfaces, the engagement surfaces being positioned on opposite sides of the center axis of the wrench device, the engagement surfaces of the socket being configured to be positioned around the nut on the end of the bolt in response to the socket being positioned around the nut on the end of the bolt;

a rod positioned in the center bore of the wrench device, the rod having an axial length that extends between a proximal end of the rod and the distal end of the rod, the rod having a center axis that is coaxial with the center axis of the wrench device, the rod having a piercing tip at the distal end of the rod;

an actuator operatively connected to the proximal end of the rod, the actuator being operable to move the rod and the piercing tip axially between a first position of the rod and the piercing tip relative to the wrench device where the piercing tip is not in the socket and a second position of the rod and the piercing tip relative to the wrench device where the piercing tip is in the socket; and, the piercing tip being configured to pierce and deform the end of the bolt in response to the rod and the piercing tip being moved to the second position of the rod and the piercing tip relative to the wrench device; and the nut and bolt fastener assembly being thermoplastic; and a heat source communicating with the piercing tip, the heat source heating the piercing tip whereby in a second position the piercing tip extends into the fastener assembly and thermally deforms the fastener assembly.

10. The apparatus of claim 9, further comprising:

a torque sensing device in the wrench device, the torque sensing device operatively communicating with the actuator, the actuator being operable to move the rod and the piercing tip from the first position of the rod and the piercing tip relative to the wrench device to the second position of the rod and the piercing tip relative to the wrench device in response to the torque sensing device sensing the nut being turned on the end of the bolt by the wrench device to a predetermined pre-load torque of the nut on the end of the bolt.

11. The apparatus of claim 9, further comprising:

the heat source being operatively connected to the rod, the heat source being operable to heat the rod and the piercing tip of the rod in response to the rod and the piercing tip being moved to the second position where the heated piercing tip melts the end of the bolt and deforms the end of the bolt.

12. The apparatus of claim 9, further comprising: the socket being a hexagonal socket with six engagement surfaces that are equally radially spaced from the center axis of the wrench device.

13. The apparatus of claim 9, further comprising:

the apparatus being a handheld tool that manually rotates the wrench device around the center axis of the wrench device.

14. The apparatus of claim 9, further comprising: apparatus being an automated tool that is operable to automatically rotate the wrench device around the center axis of the wrench device.

* * * * *